(12) United States Patent
Liu et al.

(10) Patent No.: US 11,564,184 B2
(45) Date of Patent: Jan. 24, 2023

(54) TIMING METHOD AND APPARATUS

(71) Applicant: Huawei Technologies Co., Ltd., Shenzhen (CN)

(72) Inventors: Fengwei Liu, Chengdu (CN); Dan Wu, Shenzhen (CN); Lei Chen, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 16/940,918

(22) Filed: Jul. 28, 2020

(65) Prior Publication Data

US 2020/0383073 A1 Dec. 3, 2020

Related U.S. Application Data

(63) Continuation of application No. PCT/CN2019/072488, filed on Jan. 21, 2019.

(30) Foreign Application Priority Data

Feb. 1, 2018 (CN) .......................... 201810103184.2

(51) Int. Cl.
*H04W 56/00* (2009.01)
*H04J 3/06* (2006.01)

(52) U.S. Cl.
CPC ......... *H04W 56/001* (2013.01); *H04J 3/0673* (2013.01)

(58) Field of Classification Search
CPC ........... H04W 56/0015; H04W 56/001; H04W 56/0045; H04W 72/0446; H04J 3/0673; H04B 7/18515; H04B 7/024; H04B 7/1555; H04B 7/2606
See application file for complete search history.

(56) References Cited

U.S. PATENT DOCUMENTS

| | | | |
|---|---|---|---|
| 2007/0201392 A1 | 8/2007 | Ramachandran | |
| 2011/0065378 A1 | 3/2011 | Watanabe | |
| 2012/0014371 A1 | 1/2012 | Weng et al. | |
| 2013/0176997 A1* | 7/2013 | Tian | H04W 56/005 370/336 |

(Continued)

FOREIGN PATENT DOCUMENTS

| | | | | |
|---|---|---|---|---|
| CN | 101425839 A | | 5/2009 | |
| CN | 102083195 | * | 6/2010 | ............ H04W 56/00 |

(Continued)

*Primary Examiner* — Ricardo H Castaneyra
(74) *Attorney, Agent, or Firm* — Slater Matsil, LLP

(57) ABSTRACT

A first node device includes a transmitter, a receiver, a processor, and a non-transitory computer-readable storage medium storing a program to be executed by the processor. The program includes instructions to cause the transmitter to send, to a second node device, an offset of a first uplink sending timing of the second node device and a first amount of timing adjustment of the second node device, cause the transmitter to send indication information to the second node device, where the indication information indicates whether the second node device sends uplink data by using the first uplink sending timing of the second node device, and receive, through the receiver, data sent by the second node device, where the first node device is a parent node device of the second node device.

20 Claims, 5 Drawing Sheets

(56) References Cited

U.S. PATENT DOCUMENTS

| | | | |
|---|---|---|---|
| 2013/0336268 A1* | 12/2013 | Better | H04W 56/0005 370/329 |
| 2014/0016559 A1* | 1/2014 | Jang | H04W 56/001 370/328 |
| 2014/0086161 A1 | 3/2014 | Cai et al. | |
| 2015/0304891 A1* | 10/2015 | Dinan | H04W 72/0413 370/331 |
| 2016/0365896 A1* | 12/2016 | Tu | H04B 3/487 |
| 2018/0084546 A1* | 3/2018 | Guo | H04W 72/042 |
| 2019/0320397 A1* | 10/2019 | Tang | H04W 56/00 |

FOREIGN PATENT DOCUMENTS

| | | | | |
|---|---|---|---|---|
| CN | WO 2011017846 | * | 2/2011 | ............ H04W 56/00 |
| CN | 102083195 A | | 6/2011 | |
| CN | 102143102 A | | 8/2011 | |
| EP | 2568755 A1 | | 3/2013 | |
| EP | 3101823 A1 | | 12/2016 | |
| WO | 2007042443 A1 | | 4/2007 | |
| WO | 2011017846 A1 | | 2/2011 | |

* cited by examiner

TIMING METHOD AND APPARATUS

CROSS-REFERENCE TO RELATED APPLICATIONS

This application is a continuation of International Application No. PCT/CN2019/072488, filed on Jan. 21, 2019, which claims priority to Chinese Patent Application No. 201810103184.2, filed on Feb. 1, 2018. The disclosures of the aforementioned applications are hereby incorporated by reference in their entireties.

TECHNICAL FIELD

The present disclosure relates to communications technologies, and specifically, to a relay timing method and apparatus.

BACKGROUND

An important deployment scenario of a new radio (NR) is high frequency band being used. At the high frequency band, an electromagnetic wave has disadvantages such as a poor diffraction capability and severe propagation attenuation, resulting in a high probability that a coverage hole occurs in a network. Due to factors such as deployment costs, it is difficult for an operator to resolve a coverage hole problem by relying only on a wired transmission reception point (TRP). In this case, it is necessary to introduce a relay with a radio backhaul link. In this disclosure, a relay node with integrated access and backhaul is referred to as a relay transmission reception point (rTRP), to be distinguished from a relay in long term evolution (LTE).

An in-band relay is a relay solution in which a backhaul link and an access link use a same frequency band. The in-band relay has advantages such as high spectral efficiency and low deployment costs, but affects a physical layer protocol. In a release (release) 11 of long term evolution advance (LTE-A), the in-band relay solution is standardized. However, in LTE-A, a relay network can implement only two-hop transmission, that is, a relay node cannot serve another relay node.

In NR, the 3rd generation partnership project (3GPP) determines to use integrated access and backhaul (IAB) as an important feature to improve NR performance. JAB is an in-band relay solution in which an access link and a backhaul link are integrated. Multi-hop multi-connection is a main design objective of NR IAB. In a multi-hop multi-connection relay network, a relay node may serve another relay node, that is, a relay node may have both a parent node and a child node, where the child node may be another relay, or may be user equipment (UE) served by the relay node. When a relay node has both a parent node and a child node, a relay system has both a backhaul link and an access link. In a general time division duplex (TDD) or frequency division duplex (FDD) system, a backhaul link and an access link can be multiplexed only in a time division manner. However, when the system supports dynamic TDD or flexible duplex, frequency division multiplexing or space division multiplexing can be implemented for the backhaul link and the access link.

When frequency division multiplexing or space division multiplexing is implemented for the backhaul link and the access link by using dynamic TDD, the relay node receives both data transmitted by the parent node in downlink and data transmitted by the child node in uplink, or the relay node both sends data to the parent node on the backhaul link and sends data to the child node on the access link. In a conventional network, there is no solution for a scenario in which a relay node both receives data from a parent node on a backhaul link and receives data from a child node on an access link, and sends data to both the parent node and the child node on the backhaul link. If a conventional timing solution is used, receive or transmit orthogonal frequency division multiplexing (OFDM) symbols of the relay node cannot be aligned. If symbol alignment and demodulation reference signal (DMRS) alignment cannot be implemented for the backhaul link and the access link, it is difficult to implement a frequency division multiplexing (FDM) and space division multiplexing (SDM) system formed by the backhaul link and the access link, and it is also difficult to ensure performance.

SUMMARY

Embodiments of this disclosure provide a relay timing method and apparatus, to resolve a problem that when a relay node receives data from both an parent node of the relay node and a child node of the relay node in a first slot or subframe, or transmits data to both an parent node of the relay node and a child node of the relay node in a first slot or subframe, different timings may result in interference to the relay node when the relay node receives data, and a timing problem that occurs when the child node receives data.

To achieve the foregoing objective, the following technical solutions are used in the embodiments of this disclosure.

According to a first aspect, a timing method is provided. The timing method is applied to a wireless communications system, the wireless communications system includes a first node and a second node, the first node is an parent node of the second node, and the method includes: sending, by the first node to the second node, an offset of a first uplink sending timing of the second node and a first amount of timing adjustment of the second node, and receiving, by the first node, data sent by the second node. In the foregoing technical solution, the first node configures a timing of the second node in a first slot or subframe, so that the first node can receive data from both a third node and the second node, thereby avoiding interference caused by a timing problem and improving spectral efficiency.

In an embodiment of the first aspect, the offset of the first uplink sending timing of the second node is an offset relative to a second uplink sending timing of the second node, or an offset of the first uplink sending timing of the second node is a timing offset relative to a transmit slot or subframe of the second node. In the foregoing technical solution, a reference of the first uplink sending timing of the second node is determined, so that a relative position of the offset is determined, and a value of the offset can be minimized, thereby reducing overheads.

In another embodiment of the first aspect, the offset of the first uplink sending timing of the second node and the first amount of timing adjustment of the second node are sent by using different messages. In the foregoing technical solution, the offset of the first uplink sending timing of the second node and the first amount of timing adjustment of the second node are configured separately, so that configuration signaling overheads are further reduced, thereby improving configuration efficiency.

In another embodiment of the first aspect, the first node sends indication information to the second node, where the indication information is used to indicate whether the second node sends uplink data by using the first uplink sending timing of the second node. In the foregoing technical solution, with the indication information, the second node can be enabled to correctly select a timing, that is, using the first uplink sending timing of the second node or using the second uplink sending timing of the second node. This resolves a timing configuration problem that occurs when both a first slot or subframe and a second slot or subframe are scheduled.

In another embodiment of the first aspect, information about the offset of the first uplink sending timing of the second node and/or information about the first amount of timing adjustment of the second node include/includes an identifier of the first node. In the foregoing technical solution, a problem of how to correctly distinguish between timing configuration information when the second node has a plurality of first nodes is resolved.

In another embodiment of the first aspect, the first node sends, to the second node, an incremental value of the offset of the first uplink sending timing of the second node. In the foregoing technical solution, the offset of the first uplink sending timing of the second node is configured in an incremental manner, so that the offset of the first uplink sending timing of the second node can be adjusted by using a quite small quantity of bits, thereby reducing signaling overheads.

According to a second aspect, a timing method is provided. The method is applied to a wireless communications system, the wireless communications system includes a first node and a second node, the first node is an parent node of the second node, and the method includes: sending, by the first node to the second node, an offset of a first downlink sending timing of the first node, and sending, by the first node, data to the second node. In the foregoing technical solution, the first node notifies the second node of a sending timing in a first slot or subframe, so that the second node can receive data by using a correct timing, thereby avoiding a data reception failure resulting from an inaccurate timing or use of an incorrect timing, and improving spectral efficiency.

In an embodiment of the second aspect, the offset of the first downlink sending timing of the first node is a timing offset relative to a start position of a transmit slot or subframe of the first node. In the foregoing technical solution, a reference timing of the offset of the first downlink sending timing of the first node is determined, so that the second node can obtain a correct timing of a first slot or subframe, thereby simplifying configuration and reducing signaling overheads.

In another embodiment of the second aspect, the first node sends indication information to the second node, where the indication information is used to indicate whether the second node receives downlink data by using the first downlink sending timing of the first node. In the foregoing technical solution, with the indication information, the second node can be enabled to correctly select a reception timing, that is, using a first downlink reception timing of the second node or using a second downlink reception timing of the second node. This resolves a timing configuration problem that occurs when both a first slot or subframe and a second slot or subframe are scheduled.

In another embodiment of the second aspect, information about the offset of the first downlink sending timing of the first node includes an identifier of the first node. In the foregoing technical solution, a problem of how to correctly distinguish between timing configuration information when the second node has a plurality of first nodes is resolved.

In another embodiment of the second aspect, the first node sends, to the second node, an incremental value of the offset of the first downlink sending timing of the first node. In the foregoing technical solution, the offset of the first downlink sending timing of the first node is configured in an incremental manner, so that the offset of the first downlink sending timing of the first node can be adjusted by using a quite small quantity of bits, thereby reducing signaling overheads.

According to a third aspect, a timing method is provided. The method is applied to a wireless communications system, the wireless communications system includes a first node and a second node, the first node is an parent node of the second node, and the method includes: receiving, by the second node, an offset of a first uplink sending timing of the second node and a first amount of timing adjustment of the second node that are sent by the first node, and sending, by the second node, data to the first node. In the foregoing technical solution, the second node receives a timing configuration for a first slot or subframe from the first node, so that the second node can use a correct uplink sending timing, thereby avoiding interference caused by a timing unaligned with data received by the first node from a third node, and improving spectral efficiency.

In another embodiment of the third aspect, the offset of the first uplink sending timing of the second node is an offset relative to a second uplink sending timing of the second node, or the offset of the first uplink sending timing of the second node is a timing offset relative to a transmit slot or subframe of the second node. In the foregoing technical solution, a reference of the first uplink sending timing of the second node is determined, so that a relative position of the offset is determined, and a value of the offset can be minimized, thereby reducing overheads.

In another embodiment of the third aspect, the offset of the first uplink sending timing of the second node and the first amount of timing adjustment of the second node are received by using different messages. In the foregoing technical solution, the offset of the first uplink sending timing of the second node and the first amount of timing adjustment of the second node are configured separately, so that configuration signaling overheads are further reduced, thereby improving configuration efficiency.

In another embodiment of the third aspect, the second node receives indication information sent by the first node, where the indication information is used to indicate whether the second node sends uplink data by using the first uplink sending timing of the second node. In the foregoing technical solution, with the indication information, the second node can be enabled to correctly select a timing, that is, using the first uplink sending timing of the second node or using the second uplink sending timing of the second node. This resolves a timing configuration problem that occurs when both a first slot or subframe and a second slot or subframe are scheduled.

In another embodiment of the third aspect, information about the offset of the first uplink sending timing of the second node and/or information about the first amount of timing adjustment of the second node include/includes an identifier of the first node. In the foregoing technical solution, a problem of how to correctly distinguish between timing configuration information when the second node has a plurality of first nodes is resolved.

In another embodiment of the third aspect, the second node receives an incremental value, sent by the first node, of the offset of the first uplink sending timing of the second node. In the foregoing technical solution, the offset of the first uplink sending timing of the second node is configured in an incremental manner, so that the offset of the first uplink sending timing of the second node can be adjusted by using a quite small quantity of bits, thereby reducing signaling overheads.

According to a fourth aspect, a timing method is provided. The method is applied to a wireless communications system, the wireless communications system includes a first node and a second node, the first node is an parent node of the second node, and the method includes: receiving, by the second node, an offset, sent by the first node, of a first downlink sending timing of the first node, and sending, by the first node, data to the second node. In the foregoing technical solution, the second node receives a sending timing, sent by the first node, of a first slot or subframe, so that the second node can receive data by using a correct timing, thereby avoiding a data reception failure resulting from an inaccurate timing or use of an incorrect timing, and improving spectral efficiency.

In an embodiment of the fourth aspect, the offset of the first downlink sending timing of the first node is a timing offset relative to a start position of a transmit slot or subframe of the first node. In the foregoing technical solution, a reference timing of the offset of the first downlink sending timing of the first node is determined, so that the second node can obtain a correct timing of a first slot or subframe, thereby simplifying configuration and reducing signaling overheads.

In another embodiment of the fourth aspect, the second node receives indication information sent by the first node, where the indication information is used to indicate whether the second node receives downlink data by using the first downlink sending timing of the first node. In the foregoing technical solution, with the indication information, the second node can be enabled to correctly select a timing, that is, using a first downlink reception timing of the second node or using a second downlink reception timing of the second node. This resolves a timing configuration problem that occurs when both a first slot or subframe and a second slot or subframe are scheduled.

In another embodiment of the fourth aspect, information about the offset of the first downlink sending timing of the first node includes an identifier of the first node. In the foregoing technical solution, a problem of how to correctly distinguish between timing configuration information when the second node has a plurality of first nodes is resolved.

In another embodiment of the fourth aspect, the second node receives an incremental value, sent by the first node, of the offset of the first downlink sending timing of the first node. In the foregoing technical solution, the offset of the first downlink sending timing of the first node is configured in an incremental manner, so that the offset of the first downlink sending timing of the first node can be adjusted by using a quite small quantity of bits, thereby reducing signaling overheads.

According to still another aspect of this disclosure, a first node device is provided. The first node device is configured to implement functions in the timing method according to any one of the first aspect or the embodiments of the first aspect and any one of the second aspect or the embodiments of the second aspect. The functions may be implemented by hardware, or may be implemented by executing corresponding software by hardware. The hardware or software includes one or more units corresponding to the foregoing functions.

In another embodiment, a structure of the first node device includes a processor and a memory, where the memory stores code and data, the memory is coupled to the processor, and the processor is configured to support the first node device in performing the timing method according to any one of the first aspect or the embodiments of the first aspect and any one of the second aspect or the embodiments of the second aspect. Optionally, the first node device may further include a communications interface and a bus, where the communications interface is connected to the memory and the processor by using the bus.

According to still another aspect of this disclosure, a second node device is provided. The second node device is configured to implement functions in the timing method according to any one of the third aspect or the embodiments of the third aspect and any one of the fourth aspect or the embodiments of the fourth aspect. The functions may be implemented by hardware, or may be implemented by executing corresponding software by hardware. The hardware or software includes one or more units corresponding to the foregoing functions.

In another embodiment, a structure of the second node device includes a processor and a memory, where the memory stores code and data, the memory is coupled to the processor, and the processor is configured to support the second node device in performing the timing method according to any one of the third aspect or the embodiments of the third aspect and any one of the fourth aspect or the embodiments of the fourth aspect. Optionally, the second node device may further include a communications interface and a bus, where the communications interface is connected to the memory and the processor by using the bus.

According to still another aspect of this disclosure, a computer readable storage medium is provided. The computer readable storage medium stores an instruction, and when the instruction runs on a computer, the computer is enabled to perform the timing method according to any one of the first aspect or the embodiments of the first aspect, the timing method according to any one of the second aspect or the embodiments of the second aspect, the timing method according to any one of the third aspect or the embodiments of the third aspect, or the timing method according to any one of the fourth aspect or the embodiments of the fourth aspect.

According to still another aspect of this disclosure, a computer program product including an instruction is provided. When the computer program product runs on a computer, the computer is enabled to perform the timing method according to any one of the first aspect or the embodiments of the first aspect, the timing method according to any one of the second aspect or the embodiment of the second aspect, the timing method according to any one of the third aspect or the embodiments of the third aspect, or the timing method according to any one of the fourth aspect or the embodiments of the fourth aspect.

According to still another aspect of this disclosure, a communications system is provided. The communications system includes a plurality of devices, and the plurality of devices include a first node device and a second node device, where the first node device is the first node device according to the foregoing aspects, and is configured to support the timing method according to any one of the first aspect or the embodiments of the first aspect and the timing method according to any one of the second aspect or the embodiments of the second aspect, and/or the second node device is the second node device according to the foregoing aspects, and is configured to support the timing method according to any one of the third aspect or the embodiments of the third aspect and the timing method according to any one of the fourth aspect or the embodiments of the fourth aspect.

It can be understood that the foregoing provided apparatus, computer storage medium, or computer program product of any one of the timing methods is configured to perform the corresponding method provided above, and therefore, for beneficial effects that the apparatus, the computer storage medium, or the computer program product can achieve, reference may be made to beneficial effects of the corresponding method provided above. Details are not described herein again.

DETAILED DESCRIPTION OF ILLUSTRATIVE EMBODIMENTS

The following clearly and completely describes technical solutions in embodiments of this disclosure with reference to the accompanying drawings in the embodiments of this disclosure. Apparently, the described embodiments are merely some rather than all embodiments of the present invention. All other embodiments obtained by a person skilled in the art based on the embodiments of the present invention without creative efforts shall fall within the protection scope of the present invention.

It should be understood that names of all signaling messages in this disclosure are merely names specified for ease of description in this disclosure, and may be different in an actual network. It should not be understood as that names of various types of signaling are limited in this disclosure. On the contrary, any name with a function the same as or similar to that of the signaling message used in this application is considered as a method in this disclosure or an equivalent replacement, and falls within the protection scope of this disclosure. Details are not described below again.

Figure 1:
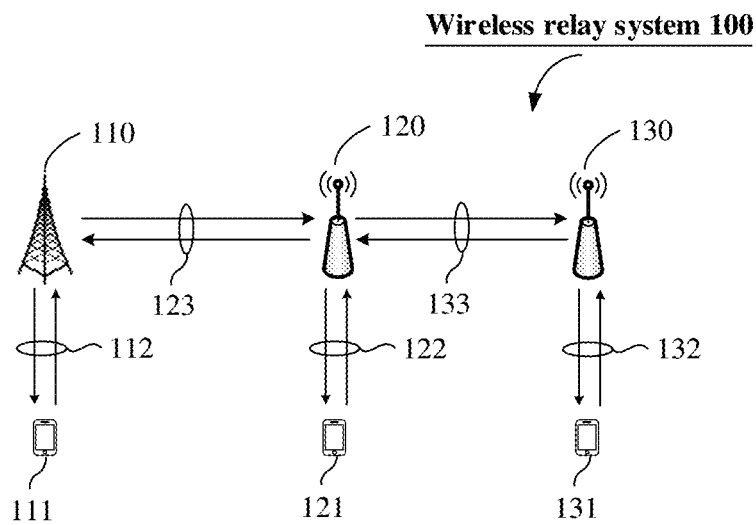
FIG. 1 shows a radio relay system according to an embodiment of this disclosure.

FIG. 1 shows a radio relay system according to an embodiment of this disclosure. It should be noted that the radio relay system mentioned in this embodiment of this disclosure includes but is not limited to: a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a next-generation 5G mobile communications system, a machine to machine (M2M) communications system, or the like.

As shown in FIG. 1, one radio relay system 100 includes at least one base station 110, at least one user equipment (UE) 111 served by the base station 110, one or more relay nodes rTRP 120, and one or more UEs 121 served by the rTRP 120, wherein the base station 110 is usually referred to as a donor gNB (donor Next Generation NodeB, DgNB) in a next-generation radio air interface, and the rTRP 120 is connected to the base station 110 by using a radio backhaul link 123. The base station includes but is not limited to: an evolved NodeB (eNB), a radio network controller (RNC), a NodeB (NB), a base station controller (BSC), a base transceiver station (BTS), a home eNodeB (for example, a Home evolved NodeB, or Home NodeB, HNB for short), a baseband unit (BBU), a next-generation new radio NR base station (for example, a gNB), or the like.

An integrated access and backhaul system may further include another one or more relay nodes rTRP 130 and one or more UEs 131 served by the rTRP 130, where the one or more reply nodes rTRP 130 are connected to the relay nodes rTRP 120 by using one or more radio backhaul links 133 for accessing the system. In the figure, both the relay node rTRP 120 and the relay node rTRP 130 are connected to a network by using a radio backhaul link. In this disclosure, the radio backhaul links are all described from a perspective of a relay node. For example, the radio backhaul link 123 is a backhaul link of the relay node rTRP 120, and the radio backhaul link 133 is a backhaul link of the relay node rTRP 130. As shown in FIG. 1, a relay node, for example, 130, may be connected to another relay node, for example, 120, by using a radio backhaul link, for example, 133, to be connected to the network. In addition, the radio relay system may be connected to the network through a plurality of radio relay hops. Usually, a node that provides radio backhaul link resources, for example, 120, is referred to as a parent node, and a relay node that accesses a network by using a radio backhaul link, for example, 130, is referred to as a child node. Usually, a child node may be considered as user equipment UE of a parent node. It should be understood that in the integrated access and backhaul system shown in FIG. 1, one relay node is connected to one parent node, but in a future relay system, to improve reliability of a radio backhaul link, one relay node, for example, 130, may be simultaneously served by a plurality of parent nodes. In this disclosure, the user equipments UEs 111, 121, and 131 may be stationary or mobile devices. For example, a mobile device may be a mobile phone, an intelligent terminal, a tablet computer (tablet), a notebook computer (laptop), a video game console, a multimedia player, or even a mobile or stationary relay node. A stationary device is usually located in a fixed place, for example, a computer or an access point (connected to a network by using a radio link, for example, a relay node). Names of the relay nodes rTRP 120 and rTRP 130 constitute no limitation on scenarios or networks in which the relay nodes rTRP 120 and rTRP 130 are deployed, and may be, for example, relay, RN, or any other name. Using rTRP in this disclosure is merely for ease of description.

In FIG. 1, all the radio links 112, 122, 123, 132, and 133 may be bidirectional links, including uplink and downlink transmission links. In particular, the radio backhaul links 123 and 133 may be used by a parent node to provide a service for a child node. For example, the parent node no provides a wireless backhaul service for the child node 120. Downlink transmission means that a parent node, for example, the node no, performs transmission for a child node, for example, the node 120. Uplink transmission means that a child node, for example, the node 120, transmits data to a parent node, for example, the node no. The node is not limited to a network node or UE. For example, in a device-to-device (D2D) scenario, the UE may work as a relay node to serve another UE. A radio backhaul link may also be an access link in some scenarios. For example, for the node 120, the backhaul link 133 may also be considered as an access link, and the backhaul link 123 is also an access link of the node no.

For ease of description, in the following, a relay node is referred to as a first node, a parent node of the first node is referred to as a third node, and a child node of the first node is referred to as a second node. The first node and the third node may be base stations, relay nodes, UEs with a relay function, or any device with a relay function. The second node may be a relay node, UE with a relay function, any device with a relay function, UE with a network access function, or any device with a network access function. A slot or subframe in which both uplink transmission and downlink transmission are performed may be referred to as a special slot or subframe. The special slot or subframe may also be referred to as a first slot or subframe. For example, the first node sends information to both the second node and the third node in the first slot or subframe, or receives, in the first slot or subframe, both information sent by the second node and information sent by the third node. A slot or subframe in which only uplink transmission is performed, or a slot or subframe in which only downlink transmission is performed, may be referred to as an ordinary slot or subframe. The ordinary slot or subframe may also be referred to as a second slot or subframe. For example, the first node only sends information to or receives information from the second node in the second slot or subframe, or only sends information to or receives information from the third node in the second slot or subframe.

When a relay node is under a half-duplex constraint, a radio backhaul link of an in-band relay overlaps spectrum resources of an access link. In other words, the backhaul link of the in-band relay and the access link use a same frequency band. For example, when performing reception on a downlink radio backhaul link of a base station, an rTRP cannot perform transmission to a subordinate UE or device, and when performing uplink transmission to a parent node on a backhaul link, an rTRP cannot receive transmission performed by a subordinate UE or device on an uplink access link or transmission performed by a child node on a backhaul link. The half-duplex constraint of the in-band relay is a half-duplex constraint on reception and transmission that are performed simultaneously on a same frequency, is irrelevant to a duplex mode (TDD or FDD) used by the system, and is applied to a same slot, subframe, or symbol.

Under the half-duplex constraint, to improve spectrum resource utilization, a possible method is that the first node receives uplink transmission of the second node while receiving data from the third node. For example, the rTRP 120 receives data from both the base station no and the second node rTRP 130. That the first node receives data transmission from both the second node and the third node in the first slot or subframe requires that an offset between a time point at which data transmitted by the second node arrives at the first node and a time point at which downlink transmission of the third node is received should not exceed a range of a cyclic prefix (CP). A timing at which the first node receives data from the third node is determined by a distance between the first node and the third node, and transmission of the second node needs to adapt to the timing at which the first node receives data from the third node. Therefore, an uplink sending timing of the second node needs to be controlled. Similarly, the first node may also send data to both the third node and the second node in the first slot or subframe, and similarly, a reception timing of the second node in the first slot or subframe also needs to be controlled.

The timing in this disclosure is a determined time or moment at which a device performs a data reception or sending action. The device includes but is not limited to the foregoing base station, relay node, or user equipment, or the like. For example, an uplink sending timing is a specific determined time of uplink transmission, for example, a beginning of a specific slot or subframe or any other determined time, a downlink reception timing is a specific determined time at which data or a signal is received, and a downlink sending timing is a determined time or moment at which downlink data or a downlink signal is transmitted. An amount of timing adjustment (ATA) in this disclosure is an adjustment amount for a timing, that is, adjusting a time or moment of a timing. Details are not described below again. A timing at which uplink transmission is performed in the second slot or subframe is referred to as a second uplink sending timing, and a timing at which uplink transmission is performed in the first slot or subframe is referred to as a first uplink sending timing. A timing at which downlink transmission is performed in the second slot or subframe is referred to as a second downlink sending timing, and a timing at which downlink transmission is performed in the first slot or subframe is referred to as a first downlink sending timing.

There is a difference between a transmission timing used by the second node when performing uplink transmission in the first slot or subframe and a second uplink sending timing of the second node, where the second node uses the transmission timing for adapting to a timing at which the first node receives downlink transmission of the third node. Therefore, the transmission timing needs to be controlled. The second uplink sending timing is a timing used when the first node only schedules, for uplink transmission, the second node served by the first node, and does not receive downlink transmission of the third node, that is, an uplink transmission timing of the second node in the second slot or subframe. The second uplink sending timing is usually obtained through adjustment of an uplink sending time of the second node in the second slot or subframe by a second amount of timing adjustment, so that a time at which uplink transmission of the second node arrives at the first node is exactly a start position of the second slot or subframe of the first node. The second amount of timing adjustment is an amount of timing adjustment used when sending is performed in the second slot or subframe, and is also referred to as a second amount of timing adjustment of the second node. In this application, the second uplink sending timing is also referred to as a second uplink sending timing of the second node. A timing used by the second node in the first slot or subframe is referred to as a first uplink sending timing of the second node. The first uplink sending timing of the second node may be adjusted by using an offset relative to the second uplink sending timing of the second node and a first amount of timing adjustment of the second node. The first amount of timing adjustment of the second node is an amount of timing adjustment intended for the first slot or subframe. By using the first amount of timing adjustment of the second node, the first uplink sending timing of the second node may be slightly adjusted. It should be understood that the first amount of timing adjustment of the second node has a default value of 0 when not being configured.

Therefore, an offset of the first uplink sending timing of the second node is the offset relative to the second uplink sending timing of the second node. When the second node is a relay node, the offset of the first uplink sending timing of the second node may be alternatively a timing offset relative to a transmit slot or subframe of the second node. This is because when the second node is a relay node, the transmit slot or subframe of the second node has a fixed position, and may be used as a reference for the first uplink sending timing of the second node.

It should be understood that when the first node performs sending to both the third node and the second node, a timing problem also exists. Uplink transmission performed by the first node for the third node is controlled by the third node. Therefore, when the second node performs data reception, a reception timing of the second node is different from a second downlink reception timing, and therefore needs to be controlled. The second downlink reception timing is a timing at which the second node receives a synchronization signal of the first node. From a perspective of the first node, the second downlink reception timing of the second node corresponds to a second downlink sending timing of the first node. In an embodiment, the first node only performs downlink transmission for the second node served by the first node, and does not perform uplink transmission for the third node. In this case, the second downlink sending timing is the second downlink sending timing of the first node, and the second downlink sending timing of the first node is also a start position of a transmit slot or subframe of the first node. In this disclosure, when the first node performs sending to both the third node and the second node, a timing used when the first node sends data to the second node is referred to as a first downlink sending timing of the first node, that is, a timing used when data transmission is performed to the second node in the first slot or subframe. The first downlink sending timing of the first node has a specific offset relative to the second downlink sending timing of the first node. The first downlink sending timing of the first node may be represented by an offset relative to the second downlink sending timing of the first node. The offset is referred to as an offset of the first downlink sending timing of the first node.

Figure 2:
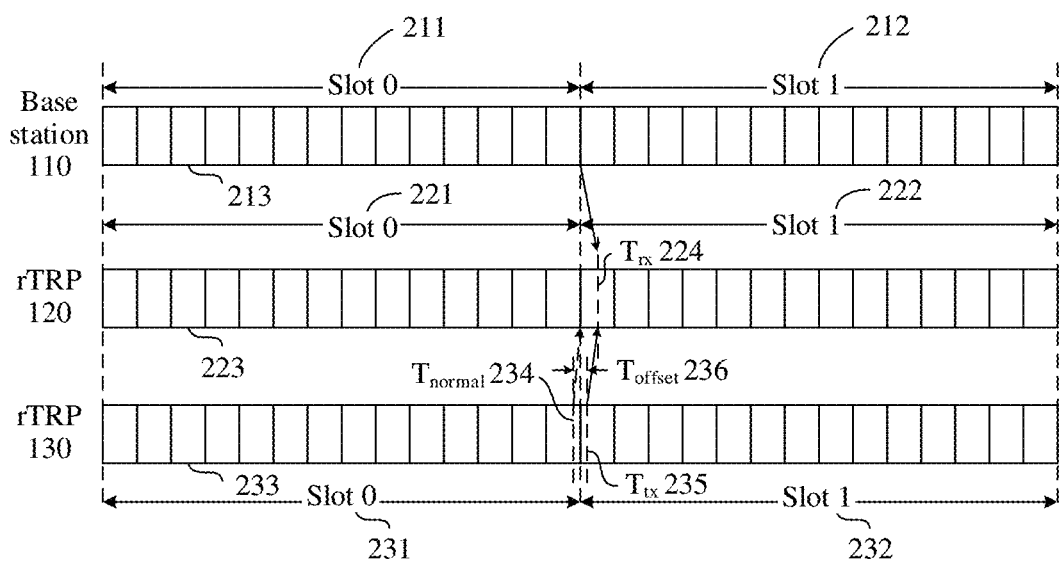
FIG. 2 shows a timing when a first node receives data according to an embodiment of this disclosure.

FIG. 2 shows a timing when a first node receives data according to an embodiment of this disclosure. In FIG. 2, it is assumed that a frame structure is in a TDD mode. If the base station 110 uses FDD, it may be alternatively assumed that frame structures of an uplink carrier and a downlink carrier are totally aligned. The downlink carrier is a frequency band used by the base station no to perform downlink transmission, and the uplink carrier is a frequency band used by the base station no to perform uplink transmission for a node served by the base station 110. It should be understood that there may be a specific offset between an uplink frame structure of FDD and a downlink frame structure of FDD in time domain. Details are not described below again.

FIG. 2 shows two slots 211 and 212 of the base station 110, two slots 221 and 222 of the rTRP 120, and two slots 231 and 232 of the rTRP 130. It is assumed that each slot has 14 symbols, symbols of the base station 110 are represented by 213, symbols of the rTRP 120 are represented by 223, symbols of the rTRP 130 are represented by 233, and the rTRP 120 receives data from both the base station 110 and the rTRP 130. Because a distance between the base station 110 and the rTRP 120 and a distance between the rTRP 120 and the rTRP 130 may be different, there is a specific difference between transmission delays. It is assumed that the base station 110 starts transmission from a start position of the slot 212, and the rTRP 120 receives, at a moment $T_{rx}$224, data transmitted by the base station 110. In a normal case, that is, when the rTRP 120 does not receive data from the base station 110 but only receives data from the rTRP 130 and the UE 121 served by the rTRP 120, the rTRP 120 controls, by using an ATA, a second timing used by the rTRP 130 or the UE 121 when performing uplink transmission, so that transmissions of all child nodes arrive at the rTRP 120 at a same or basically same moment, for example, a start position of the slot 222. That transmissions of all child nodes arrive at the rTRP 120 at a basically same moment means that times at which the rTRP 120 receives a plurality of signals are within the range of the cyclic prefix CP. In FIG. 2, $T_{normal}$234 is the second uplink sending timing of the rTRP 130. In an embodiment, when the node schedules the second node to perform uplink transmission but does not perform reception on a radio backhaul link, a timing used by the second node when performing uplink sending is the second uplink sending timing of the second node. Usually, due to moving of the second node or due to a fault of a crystal oscillator, an uplink sending timing is inaccurate. In this case, the timing needs to be adjusted by using an amount of timing adjustment ATA. The ATA is usually an offset that controls a sending timing of the second node and that is relative to a current uplink sending timing. The current uplink sending timing is an uplink sending timing existing before the ATA is received. Usually, an ATA adjustment range is comparatively narrow. In LTE, timing control is performed by using, for example, six bits, and adjustment may be performed by using a control signaling medium access control (MAC) control element (CE) MAC layer.

If the rTRP 120 receives data from both the base station no and the rTRP 130 in the slot 222, and if the rTRP 130 performs transmission to the rTRP 120 still at the second uplink sending timing of the rTRP 130, that is, $T_{normal}$234, data received by the rTRP 120 from the base station no and data received by the rTRP 120 from the rTRP 130 do not arrive at the rTRP 120 simultaneously, possibly resulting in interference at the rTRP 120. This is because a time at which the base station no performs transmission to the rTRP 120 does not change, that is, transmission starts from a position at which the first symbol of the current slot 222 starts, and therefore, a time at which the data from the base station no arrives at the rTRP 120 does not change. Usually, when the rTRP 120 receives data from both the base station no and the rTRP 130, the first to third symbols in a current slot, for example, 222, are used for control signal transmission, and are not used for data transmission. Therefore, the rTRP 130 should not perform uplink transmission at a normal uplink sending timing of the rTRP 130. Therefore, when the rTRP 120 receives data transmission from both the base station no and the rTRP 130, there is a specific offset between the first uplink sending timing of the rTRP 130 and the second uplink sending timing of the rTRP 130. The offset exceeds an adjustment range of a conventional ATA, and cannot be adjusted by using a conventional ATA. It should be understood that the rTRP 130 is used as an example for description herein, and same technical principles apply to the UE 121 served by the rTRP 120. Therefore, details are not described again.

According to the embodiment in FIG. 2, when the first node receives data on the backhaul link, if the first node also needs to receive data from the second node, a timing different from the second uplink sending timing of the second node needs to be configured for the second node. In particular, the first node sends, to the second node, the offset of the first uplink sending timing of the second node and the first amount of timing adjustment of the second node, and the second node determines an uplink sending timing based on both the first amount of timing adjustment and the offset of the first uplink sending timing of the second node.

Figure 3:
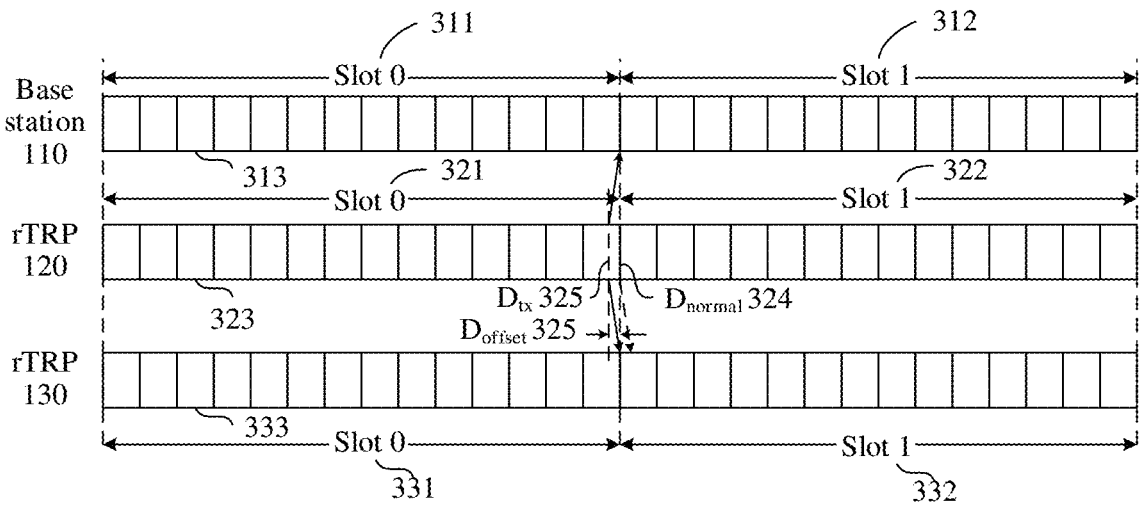
FIG. 3 shows a timing when a relay node sends data to both a parent node and a child node according to an embodiment of this disclosure.

FIG. 3 shows a timing when a relay node sends data to both a parent node and a child node according to an embodiment of this disclosure. Similarly, TDD is used as an example. FIG. 3 shows two slots 311 and 312 of the base station 110, two slots 321 and 322 of the rTRP 120, and two slots 331 and 332 of the rTRP 130. It is assumed that each slot has 14 symbols, symbols of the base station 110 are represented by 313, symbols of the rTRP 120 are represented by 323, symbols of the rTRP 130 are represented by 333, and the rTRP 120 sends data to both the base station 110 and the rTRP 130. When the rTRP 120 sends data to the base station 110, a timing is controlled by the base station 110. While sending data to the base station 110, the rTRP 120 may also transmit data to the child node rTRP 130. However, in a normal case, if the rTRP 120 sends data only to the rTRP 130 or the UE 121 served by the rTRP 120, and does not send data to the base station 110, the rTRP 120 starts sending from a start position of the first symbol in the slot 322. The sending moment is a second sending timing of the first node, that is, a start position of a transmit slot or subframe of the first node, which is a start position $D_{normal}$ 324 of the first symbol in the slot 322 in FIG. 3. It should be understood that an actual sending moment may deviate to a specific degree. Because air interface transmission causes a specific delay when the rTRP 120 performs transmission to the base station 110, to ensure that the data transmission of the rTRP 120 arrives at a start position of the receive slot 312 of the base station, the rTRP 120 needs to have a specific amount of timing adjustment used for sending. Because there is a specific amount of timing adjustment when the rTRP 120 performs uplink transmission, there is also a specific adjustment of timing, that is, $D_{tx}$ 325 in FIG. 3, when the rTRP 120 also performs transmission to a child node, for example, the rTRP 130. There is a specific offset between $D_{tx}$ 325 and $D_{normal}$ 325, and the offset is $D_{offset}$ 326. The offset may be comparatively large and exceeds an adjustment range of a second ATA, and therefore, cannot be adjusted by using a conventional ATA.

Similarly, according to the embodiment in FIG. 3, when the first node performs data transmission to both the third node and the second node, a timing different from the second downlink sending timing of the first node needs to be configured for the second node. In particular, the first node sends the offset of the first downlink sending timing of the first node to the second node, and the second node determines a downlink reception timing based on the offset of the first downlink sending timing of the first node. The offset of the first downlink sending timing of the first node is a timing offset relative to the start position of the transmit slot or subframe of the first node. It should be understood that the start position of the transmit slot or subframe of the first node herein is the second downlink sending timing. In an embodiment, there may be a slight offset between the timing and the start position of the transmit slot or subframe, for example, far less than a value of the CP. The second downlink sending timing is a timing used when the first node performs transmission only to the second node, and does not perform uplink transmission on the backhaul link in a same slot or subframe.

Figure 4:
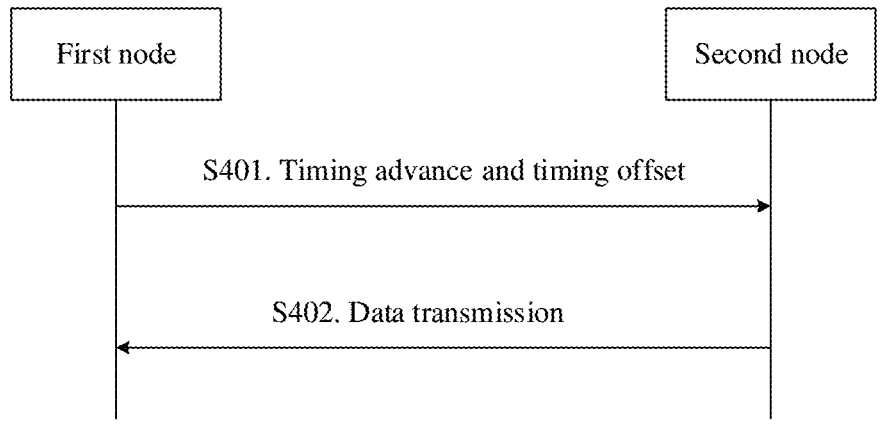
FIG. 4 shows a timing control procedure when a relay node receives data according to an embodiment of this disclosure.

FIG. 4 shows a timing control procedure when a relay node receives data according to an embodiment of this disclosure. This timing method is applied to a wireless communications system, the wireless communications system includes a first node and a second node, the first node is a parent node of the second node, and steps of the method are as follows.

S401: The first node sends, to the second node, an offset of a first uplink sending timing of the second node and an amount of timing adjustment of the first uplink sending timing of the second node.

In particular, the offset of the first uplink sending timing of the second node is an offset relative to a second uplink sending timing of the second node, or an offset of the first uplink sending timing of the second node is a timing offset relative to a transmit slot or subframe of the second node. The second uplink sending timing of the second node is as described above, and details are not described again. When the second node is another relay node, because the second node in this case has a fixed slot or subframe delimitation, the offset of the first uplink sending timing of the second node may be the timing offset relative to the transmit slot or subframe of the second node. The transmit slot or subframe herein is the slot or subframe delimitation, and a start position of the first symbol in a current slot or subframe is used as a reference. When that the offset of the first uplink sending timing of the second node is the timing offset relative to the transmit slot or subframe of the second node, a smaller quantity of bits may be used for configuration, thereby reducing signaling overheads.

To ensure that data received from a third node and data received from the second node arrive at the first node within a range of a CP, the first node needs to control the first uplink sending timing of the second node. Because there is a quite large difference between a timing used by the second node in a first slot or subframe and the second uplink sending timing of the second node, it is difficult to adjust the timing by using a conventional timing adjustment command, for example, a 6-bit timing adjustment command. In addition, frequent and comparatively-large-amount timing adjustments are also unfavorable to system stability. Therefore, it is appropriate to use the offset relative to the second uplink sending timing for a timing to be configured for the first slot or subframe, which is favorable to solution simplification and implementation.

In an optional solution, the offset of the first uplink sending timing of the second node and the amount of timing adjustment of the first uplink sending timing of the second node are sent by using different messages. The amount of timing adjustment of the first uplink sending timing is sent by using a MAC CE message, and the offset of the first uplink sending timing of the second node is sent by using a radio resource control (RRC) message or a MAC CE message. It should be understood that the amount of timing adjustment of the first uplink sending timing of the second node and the offset of the first uplink sending timing of the second node do not appear at the same time. FIG. 4 is used merely as an example for description, and does not mean that the amount of timing adjustment of the first uplink sending timing of the second node and the offset of the first uplink sending timing of the second node are configured at the same time, or are sent to the second node in a same message.

Usually, the offset of the first uplink sending timing of the second node is not frequently adjusted, and frequency of configuring the amount of timing adjustment of the first uplink sending timing of the second node depends on a requirement. In different scenarios, the amount of timing adjustment of the first uplink sending timing of the second node is adjusted at different frequencies. In particular, when the first node is a fixed node, because a distance between the third node and the first node does not change, a time point at which the first node receives data from the third node does not change. When the first node receives data transmission from the third node (for example, a base station) and the second node in the first slot or subframe, an offset between a transmission timing of the second node in the first slot or subframe and the second uplink sending timing of the second node is fixed. If the second node is also fixed, frequency of performing adjustment by using an amount of timing adjustment of the second uplink sending timing of the second node is also quite low. Adjustment is required only when a timing offset occurs due to a timing fault of the second node, for example, a fault of a crystal oscillator. If the first node is fixed and the second node moves, the amount of timing adjustment of the second uplink sending timing of the second node needs to be continuously adjusted, and the first uplink sending timing of the second node is adjusted accordingly. In other words, in this case, the first uplink sending timing of the second node and the second uplink sending timing of the second node share a same amount of timing adjustment. If the first node is a mobile relay node, because the first node moves, a timing at which the first node receives data from the third node changes frequently. Uplink transmission of a device served by the first node uses a slot or subframe delimitation of the first node as a reference, but the slot or subframe delimitation of the first node does not change as the first node moves. However, because the first node moves, the timing at which the first node receives data from the third node changes, consequently affecting the first uplink sending timing of the second node. In this case, regardless of whether the second node is fixed or moves, a first amount of timing adjustment of the second node needs to be configured frequently. In a mobile relay scenario, if movement of the relay node results in that the first amount of timing adjustment of the second node exceeds a range of an amount of time adjustment, in a possible solution, the first node may re-configure the offset of the first uplink sending timing of the second node. For example, in the mobile relay scenario, if the movement of the relay node results in that the first amount of timing adjustment of the second node exceeds the range of the amount of time adjustment, or if the third node changes, the offset of the first uplink sending timing of the second node may be re-configured. It should be understood that the re-configuration herein does not constrain any implementation scenario, and the offset of the first uplink sending timing of the second node may be re-configured depending on a requirement.

It should be understood that configurations of the first amount of timing adjustment of the second node in different cases may be different. In some scenarios, for example, when the first node is a fixed node, that is, when the first node does not move, the first amount of timing adjustment of the second node is the same as a second amount of timing adjustment of the second node, but the amount of timing adjustment (including the first amount of timing adjustment of the second node and the second amount of timing adjustment of the second node) is used only for adjusting a second timing of the second node. The first uplink sending timing of the second node is adjusted by using the offset of the first uplink sending timing of the second node, because an offset between the second uplink sending timing of the second node and the first uplink sending timing of the second node is fixed. The first uplink sending timing of the second node may be adjusted through adjustment of the second uplink sending timing of the second node. In the mobile relay scenario, movement of the first node results in that the first amount of timing adjustment of the second node and the second amount of timing adjustment of the second node may be different, and need to be separately adjusted. In this case, the first uplink sending timing of the second node needs to be determined based on the offset of the first uplink sending timing of the second node and the first amount of timing adjustment of the second node. It should be understood that in this case, adjusting the second uplink sending timing of the second node by using the second amount of timing adjustment of the second node is not affected.

In an optional solution, a timing of the first slot or subframe may be alternatively adjusted in a manner of adjusting the offset of the first uplink sending timing of the second node incrementally. In other words, the first node sends, to the second node, an incremental value of the offset of the first uplink sending timing of the second node. The incremental value may be positive or negative, to perform forward or backward adjustment on the first uplink sending timing of the second node. In this case, the first amount of timing adjustment of the second node is the same as the second amount of timing adjustment of the second node, and both amounts are used only for adjusting the second uplink sending timing of the second node. The adjusting the offset of the first uplink sending timing of the second node incrementally means that a value of the offset of the first uplink sending timing of the second node changes with a configured incremental value. Therefore, this also results in that the first uplink sending timing of the second node relative to the second uplink sending timing of the second node changes with the value of the offset of the first uplink sending timing of the second node. Through incremental adjustment of the offset of the first uplink sending timing of the second node, the offset of the first uplink sending timing of the second node may be adjusted by using only a comparatively small quantity of bits, thereby effectively reducing signaling overheads used for offset configuration.

According to this embodiment, transmitting different messages by using different signaling can improve signaling transmission efficiency. Information changing frequently may be configured by using underlying signaling, to improve a configuration speed, and information not changing frequently is configured by using higher layer signaling, to reduce control channel overheads.

S402: The first node receives data sent by the second node.

After the second node receives the offset of the first uplink sending timing of the second node and the first amount of timing adjustment of the second node that are sent by the first node, if the first node schedules, in a specific first slot or subframe, the second node to perform uplink transmission, the second node determines a timing based on the offset of the first uplink sending timing of the second node and the first amount of timing adjustment of the second node, and performs data transmission in a specified slot or subframe by using the timing.

In an embodiment, if the first amount of timing adjustment of the second node is the same as the second amount of timing adjustment of the second node, the first amount of timing adjustment of the second node or the second amount of timing adjustment of the second node is used for adjusting the second uplink sending timing of the second node. The first uplink sending timing of the second node is adjusted by using the offset of the first uplink sending timing of the second node and the second uplink sending timing of the second node. If the first amount of timing adjustment of the second node is different from the second amount of timing adjustment of the second node, the second amount of timing adjustment of the second node is used for adjusting the second uplink sending timing of the second node. The first uplink sending timing of the second node is adjusted by using the offset of the first uplink sending timing of the second node and the first amount of timing adjustment of the second node, and the offset of the first uplink sending timing of the second node is relative to the second uplink sending timing of the second node. In an optional solution, the first amount of timing adjustment of the second node is the same as the second amount of timing adjustment of the second node, the first amount of timing adjustment of the second node or the second amount of timing adjustment of the second node is used for adjusting the second uplink sending timing of the second node, and the first uplink sending timing of the second node may be alternatively adjusted by adjusting the value of the offset of the first uplink sending timing of the second node incrementally.

In an optional solution, to enable UE to apply a correct timing, the first node sends indication information to the second node, where the indication information is used to indicate whether the second node sends uplink data by using the first uplink sending timing of the second node. In other words, the first node needs to notify the second node whether the second node transmits uplink data by using the first uplink sending timing of the second node or by using the second uplink sending timing of the second node. The indication information is usually indicated in scheduling signaling, for example, a physical downlink control channel (PDCCH). One bit may be used to indicate whether the uplink sending timing of the second node is adjusted by using the first uplink sending timing of the second node or by using the second uplink sending timing of the second node. The indication information may be alternatively configured by using a MAC CE.

In this embodiment, when the first node sends, to the second node, the offset of the first uplink sending timing of the second node and the first amount of timing adjustment of the second node, the method further includes: sending, by the first node to the second node at a time at least one slot or subframe before the second node uses the first uplink sending timing of the second node, the indication information indicating whether the first uplink sending timing of the second node is used. Considering a delay caused by scheduling processing, when scheduling the second node to perform transmission in the first slot or subframe, the first node may adjust the offset of the first uplink sending timing of the second node and/or the amount of timing adjustment of the uplink sending timing of the second node for the second node. If the offset of the first uplink sending timing of the second node and the amount of timing adjustment of the uplink sending timing of the second node have been configured, the indication information is adjusted to be sent at least one slot or subframe later, so that the second node can have sufficient time to prepare uplink data and determine a timing.

According to this embodiment, the second node can be enabled to correctly determine a used timing and perform correct uplink transmission.

By using the foregoing steps S401 and S402, a timing transmission problem of the second node in the first slot or subframe can be effectively resolved, thereby reducing interference to data reception at the first node and improving transmission efficiency.

Figure 5:
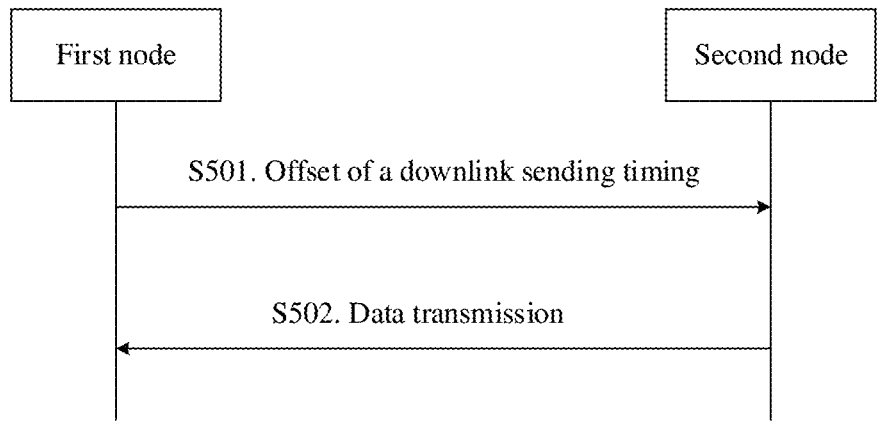
FIG. 5 shows a timing control procedure when a relay node sends data according to an embodiment of this disclosure.

FIG. 5 shows a timing control procedure when a relay node sends data according to an embodiment of this disclosure. Similarly, this timing method is applied to a wireless communications system, the wireless communications system includes a first node and a second node, the first node is a parent node of the second node, and steps of the method are as follows.

S501: The first node sends an offset of a first downlink sending timing of the first node to the second node.

Different from a case in which the first node receives both transmission from a third node and uplink transmission from the second node, when the first node transmits data to both the third node and the second node, only the offset of the first downlink sending timing of the first node needs to be configured for the second node. For a plurality of second nodes served by the first node, because each second node may be at a different distance from the first node, times at which the second nodes receive first downlink transmission from the first node are different. Therefore, it is difficult to configure a reception timing for each second node. However, because the offset of the first downlink sending timing of the first node is fixed for all the second nodes, it is quite easy to perform unified configuration for all the second nodes, thereby simplifying the system.

The offset of the first downlink sending timing of the first node is a timing offset relative to a start position of a transmit slot or subframe of the first node. A specific definition is as described above, and details are not described again. A specific quantity of bits used to represent the offset of the first downlink sending timing of the first node depends on an actual requirement, and is not limited in this embodiment. For example, similar to an amount of timing adjustment in a random access response in LTE, 11 bits may be used, or another length may be used.

Similar to the case in which the first node receives transmission from both the third node and the second node, when the first node is a fixed node, a value of the offset of the first downlink sending timing of the first node basically remains unchanged, and in this case, a comparatively small amount of configuration signaling is used. When the first node is a mobile node, because a timing of uplink sending (for example, performing sending to a base station) of the first node may change frequently, the value may change frequently. In this case, an optional solution is to configure another amount of timing adjustment of the first downlink sending timing of the first node, where the amount of timing adjustment of the first downlink sending timing of the first node is based on a configured first downlink sending timing of the first node. In this case, the amount of timing adjustment of the first downlink sending timing of the first node may be more frequently adjusted. Another method may be alternatively slightly adjusting the offset. A size of the offset is controlled in an incremental adjustment manner, to reduce signaling overheads used for offset configuration. In other words, the first node sends an incremental value of the offset of the first downlink sending timing of the first node to the second node. The incremental value may be positive or negative, to perform forward or backward adjustment on a first downlink reception timing of the second node. A difference between the two methods is that the former is to adjust the amount of timing adjustment of the first downlink sending timing of the first node, whereas the latter is to adjust the value of the offset of the first downlink sending timing of the first node. A specific manner to be used may depend on a protocol definition, and this is not limited in this embodiment.

Whether the amount of timing adjustment of the first downlink sending timing of the first node is configured depends on a motion attribute of the first node, that is, whether the first node is a fixed node or a mobile mode.

S502: The first node sends data to the second node.

After the second node receives the offset of the first downlink sending timing of the first node sent by the first node, if the first node performs data transmission to both the third node and the second node in a specific first slot or subframe, that is, downlink transmission in the first slot or subframe, the second node determines a timing based on the offset of the first downlink sending timing of the first node and a second downlink reception timing, and receives data in a specified slot or subframe by using the timing. The second downlink reception timing is as described above, and details are not described again.

If the first node configures the amount of timing adjustment of the first downlink sending timing of the first node for the second node, the first node further needs to receive downlink data based on the amount of timing adjustment of the first downlink sending timing of the first node.

In an optional solution, because a timing of the first slot or subframe and a timing of a second slot or subframe are different, to enable UE to apply a correct timing, the first node sends indication information to the second node, where the indication information is used to indicate whether the second node receives downlink data by using the first downlink sending timing of the first node. In other words, the first node needs to notify the second node whether the second node determines the timing based on the offset of the downlink sending timing of the first node or based on a normal downlink sending timing of the first node. The indication information is usually indicated in scheduling signaling, for example, a PDCCH. One bit may be used to indicate whether the offset of the downlink sending timing of the first node is used for adjusting the downlink reception timing of the second node, or the normal downlink sending timing of the first node is used for determining the downlink data reception timing. The indication information may be alternatively configured by using a MAC CE.

In this embodiment, when the first node sends the offset of the first downlink sending timing of the first node to the second node, the method further includes: sending, by the first node, information about the offset of the first downlink sending timing of the first node or indication information of the first downlink sending timing of the first node to the second node at a time at least one slot or subframe before the second node uses the offset of the first downlink sending timing of the first node. Because the second node may schedule a node served by the second node to perform uplink transmission in a same slot, to avoid a scheduling conflict, when scheduling the second node to receive data in the first slot or subframe, the first node may adjust the offset of the first downlink sending timing of the first node and/or the amount of timing adjustment of the first downlink sending timing of the first node for the second node. If the offset of the downlink sending timing of the first node and/or the amount of timing adjustment of the downlink sending timing of the first node have/has been configured, the indication information of the first downlink sending timing is adjusted to be sent at least one slot or subframe later, so that the second node can have sufficient time to avoid the scheduling conflict.

According to this embodiment, the second node can be enabled to receive data by using a correct timing and avoid the scheduling conflict of the second node, thereby improving transmission efficiency.

Figure 6:
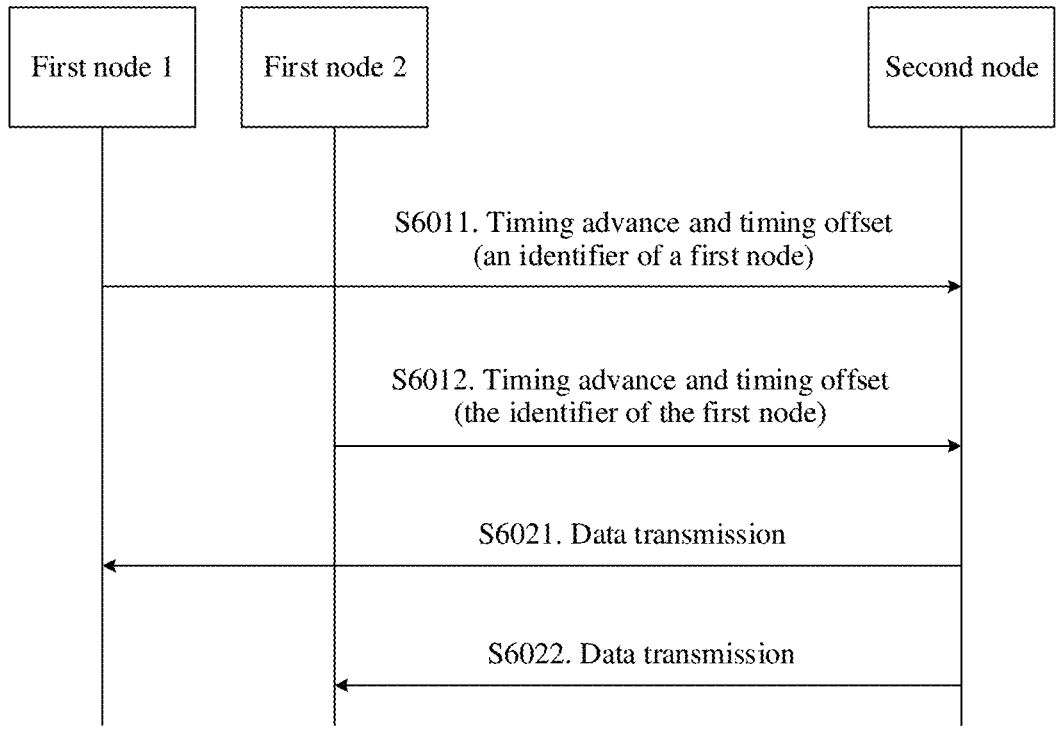
FIG. 6 shows a timing control procedure when a plurality of first nodes receive data according to an embodiment of this disclosure.

FIG. 6 shows a timing control procedure when a plurality of first nodes receive data according to an embodiment of this disclosure. As previously described, one relay node (for example, a second node) may have a plurality of parent nodes (for example, a plurality of first nodes). In this case, if the first nodes perform timing adjustment for the second node, there are a plurality of pieces of timing adjustment information of the first nodes. Each piece of timing adjustment information includes an offset of the first uplink sending timing of the second node and an amount of timing adjustment of the uplink sending timing. Timing adjustment information configured by each first node may be different. The timing adjustment information herein includes an offset of a first uplink sending timing of the second node and/or a first amount of timing adjustment of the second node. To ensure a correspondence between the timing adjustment information and the first node, information about the offset of the first uplink sending timing of the second node and/or information about the first amount of timing adjustment of the second node include/includes an identifier of the first node. In some embodiments, timing adjustment information configured by different parent nodes may be alternatively distinguished by using a link.

Steps S6011 and S6012 in FIG. 6 are the same as S401 in FIG. 4, and a difference lies in that messages in S6011 and S6012 include the identifier of the first node. Other details are not described again. It should be understood that an amount of timing adjustment and a timing offset in S6011 may be sent separately, and in this case, the identifier of the first node is included in each message. Although the amount of timing adjustment and the timing offset are placed together in the figure, it does not mean that the two messages are necessarily sent simultaneously.

Steps S6021 and S6022 are the same as step S402 in FIG. 4, and details are not described again.

According to this embodiment in this disclosure, the second node served by a plurality of first nodes can obtain a correspondence between timing adjustment information and a parent node by using timing configuration signaling, thereby avoiding that timings of a plurality of different nodes are confused.

Figure 7:
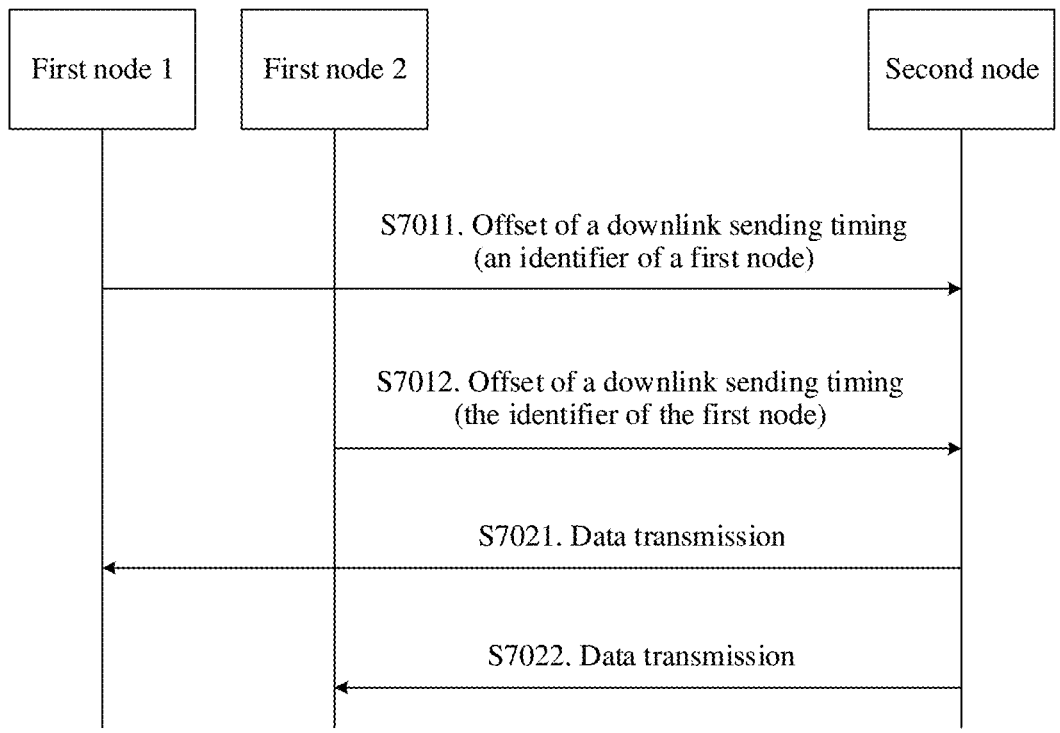
FIG. 7 shows a timing control procedure when a plurality of first nodes send data according to an embodiment of this disclosure.

FIG. 7 shows a timing control procedure when a plurality of first nodes send data according to an embodiment of this disclosure. Steps S7011 and S7012 in FIG. 7 are the same as S501 in FIG. 5, and a difference lies in that messages in S7011 and S7012 include an identifier of a first node. Other details are not described again.

Steps S7021 and S7022 are the same as step S502 in FIG. 5, and details are not described again.

Likewise, when an offset of a first downlink sending timing of the first node is adjusted in an incremental manner, incremental adjustment signaling should include the identifier of the first node. When the first node is a mobile node, if the first downlink sending timing of the first node is adjusted by using an amount of timing adjustment of the first downlink sending timing of the first node, signaling of the amount of timing adjustment of the first downlink sending timing of the first node should include the identifier of the first node.

According to this embodiment in this disclosure, a second node served by a plurality of parent nodes can obtain a correspondence between timing adjustment information and a parent node by using timing configuration signaling, thereby avoiding that timings of a plurality of different nodes are confused.

In an optional solution, when a second node has a plurality of parent nodes, that is, a plurality of first nodes, if the plurality of first nodes are distinguished by using a link, a physical layer of the second node notifies a MAC layer of the second node of a link identifier in currently received timing adjustment information, the MAC layer searches for, through matching by using the link identifier, a first amount of timing adjustment of the second node of the corresponding link (for example, a node) and/or an offset of a first uplink sending timing of the second node of the corresponding link, and performs uplink transmission timing based on a successfully matched first amount of timing adjustment of the second node and a successfully matched offset of a first uplink sending timing of the second node. With the solution, air interface signaling overheads can be avoided, and timing information can be distinguished by using different links at a physical layer.

The foregoing describes the solutions provided in the embodiments of this disclosure mainly from a perspective of interaction between network elements. It can be understood that to implement the foregoing functions, each network element, for example, the first node or the second node, includes a corresponding hardware structure and/or a software module that are/is used to perform the functions. A person skilled in the art should easily be aware that, in combination with the examples of network elements and algorithm steps described in the embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular disclosure, but it should not be considered that such an implementation goes beyond the scope of this disclosure.

In the embodiments of this disclosure, functional module division may be performed on the first node and the second node based on the foregoing method examples. For example, functional modules may be designed based on functions, or two or more functions may be integrated into one processing module. The integrated module may be implemented in a form of hardware, or may be implemented in a form of a software functional module. It should be noted that, in the embodiments of this disclosure, module division is an example, and is merely logical function division. During actual implementation, another division manner may be used. In addition, according to the foregoing method examples, there may be a plurality of first nodes. The plurality of first nodes are the same in functions and corresponding functional modules. In the following embodiments, an example in which there is only one first node is used for description, but it should be understood that a same second node may have a plurality of first nodes.

Figure 8:
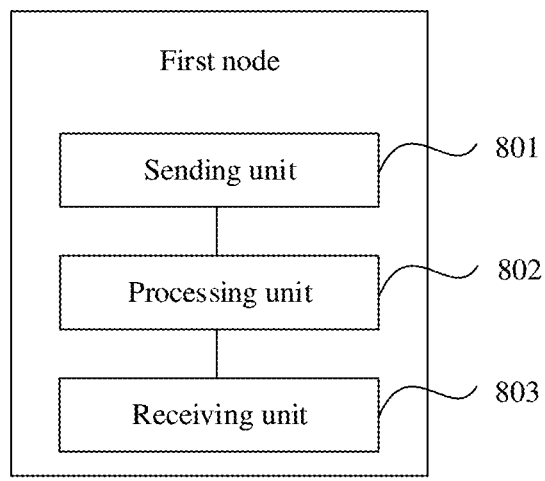
FIG. 8 is a schematic diagram of a possible structure of a first node according to an embodiment of this disclosure.

When functional modules are designed based on functions, FIG. 8 is a schematic diagram of a possible structure of a first node in the foregoing embodiments according to an embodiment of this disclosure. The first node includes a sending unit 801 and a receiving unit 803. The sending unit 801 is configured to support the first node in performing S401 in FIG. 4, step S501 in FIG. 5, step S6011 or S6012 in FIG. 6, and step S7011 or S7012 in FIG. 7, and is configured to support the first node in sending, in the foregoing embodiments to a second node, indication information, an amount of timing adjustment of a first downlink sending timing, an incremental value of an offset of a first uplink sending timing of the second node, or an incremental value of an offset of a first downlink sending timing of the first node. The receiving unit 803 is configured to support the first node in performing S402 in FIG. 4, step S502 in FIG. 5, step S6021 or S6022 in FIG. 6, or step S7021 or S7022 in FIG. 7. The first node may further include a processing unit 802, configured to support the first node device in determining the offset of the first uplink sending timing of the second node and a first amount of timing adjustment of the second node, determining the indication information to be sent to the second node, determining the offset of the first downlink sending timing of the first node device, or determining the amount of timing adjustment of the first downlink sending timing, the incremental value of the offset of the first uplink sending timing of the second node, or the incremental value of the offset of a first downlink sending timing of the first node.

In hardware example, the processing unit 802 may be a processor, the sending unit 801 may be a transmitter, and the receiving unit 803 may be a receiver. The receiver and the transmitter may form a communications interface.

Figure 9:
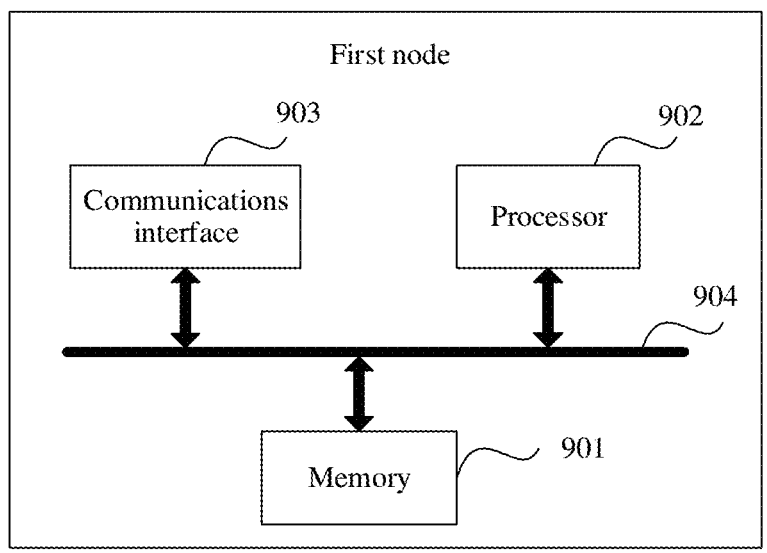
FIG. 9 is a schematic diagram of a possible logical structure of a first node according to an embodiment of this disclosure.

FIG. 9 is a schematic diagram of a possible logical structure of a first node in the foregoing embodiments according to an embodiment of this disclosure. The first node includes a processor 902. In this embodiment of this disclosure, the processor 902 is configured to control and manage an action of the first node. For example, the processor 902 is configured to support the first node in performing a step of determining an effective time of a resource. Optionally, the first node may further include a memory 901 and a communications interface 903. The processor 902, the communications interface 903, and the memory 901 may be connected to each other or may be connected to each other by using a bus 904. The communications interface 903 is configured to support the first node in performing communication, and the memory 901 is configured to store program code and data of the first node. The processor 902 calls the code stored in the memory 901 to perform control and management. The memory 901 may or may not be coupled to the processor 902.

The processor 902 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of the digital signal processor and a microprocessor. The bus 904 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
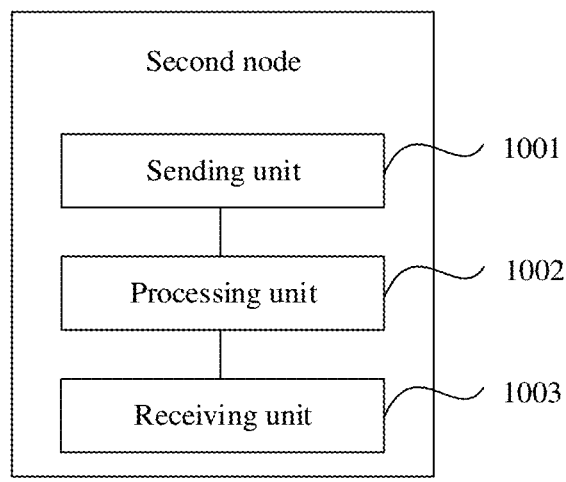
FIG. 10 is a schematic diagram of a possible structure of a second node according to an embodiment of this disclosure.

When functional modules are designed based on functions, FIG. 10 is a schematic diagram of a possible structure of a second node in the foregoing embodiments according to an embodiment of this disclosure. The second node includes a sending unit 1001 and a receiving unit 1003. The sending unit 1001 is configured to support the second node in performing S402 in FIG. 4, step S502 in FIG. 5, step S6021 or S6022 in FIG. 6, and step S7021 or S7022 in FIG. 7. The receiving unit 1003 is configured to support the second node in performing S401 in FIG. 4, step S501 in FIG. 5, step S6011 or S6012 in FIG. 6, or step S7011 or S7012 in FIG. 7, and is configured to support the second node in receiving, in the foregoing embodiments from a first node, indication information, an amount of timing adjustment of a first downlink sending timing, an incremental value of an offset of a first uplink sending timing of the second node, or an incremental value of an offset of a first downlink sending timing of the first node. The second node may further include a processing unit 1002, configured to support the second node in determining the first uplink sending timing of the second node or a first downlink reception timing of the second node based on the received offset of the first uplink sending timing of the second node and a received first amount of timing adjustment of the second node, or the received indication information sent by the first node, or the received offset of the first downlink sending timing of the first node, or the received amount of timing adjustment of the first downlink sending timing, or the received incremental value of the offset of the first uplink sending timing of the second node, or the received incremental value of the offset of the first downlink sending timing of the first node.

In hardware example, the processing unit 1002 may be a processor, the sending unit 1001 may be a transmitter, and the receiving unit 1003 may be a receiver. The receiver and the transmitter may form a communications interface.

Figure 11:
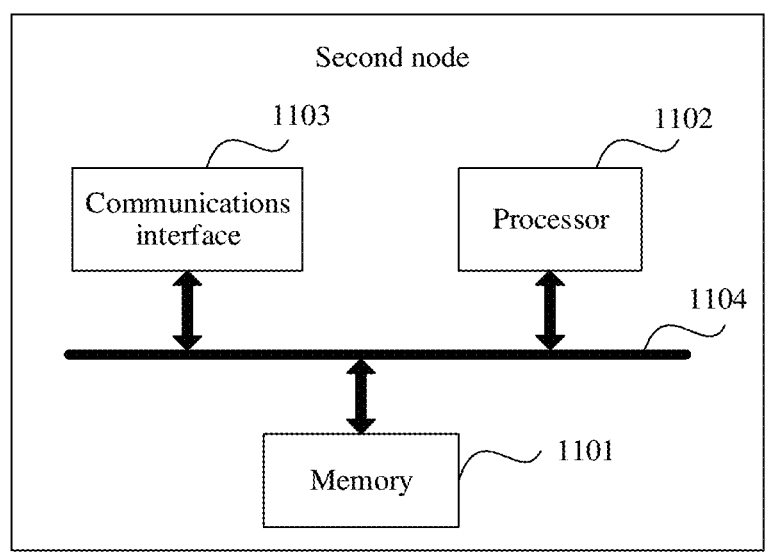
FIG. 11 is a schematic diagram of a possible logical structure of a second node according to an embodiment of this disclosure.

FIG. 11 is a possible schematic diagram of a logical structure of the second node in the foregoing embodiments according to an embodiment of this disclosure. The second node includes a processor 1102. In this embodiment of this disclosure, the processor 1102 is configured to control and manage an action of the second node. For example, the processor 1102 is configured to support the second node in performing a step of determining an effective time of a resource. Optionally, the second node may further include a memory 1101 and a communications interface 1103. The processor 1102, the communications interface 1103, and the memory 1101 may be connected to each other or may be connected to each other by using a bus 1104. The communications interface 1103 is configured to support the second node in performing communication. The memory 1101 is configured to store program code and data of the second node. The processor 1102 invokes the code stored in the memory 1101 to perform control management. The memory 1101 may be coupled to or not coupled to the processor.

The processor 1102 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of the digital signal processor and a microprocessor. The bus 1104 may be a peripheral component interconnect (Peripheral Component Interconnect, PCI) bus, an extended industry standard architecture (Extended Industry Standard Architecture, EISA) bus, and or the like. The bus may be classified into an address bus, a data bus, a control bus, and the like. For ease of representation, only one thick line is used to represent the bus in FIG. 11, but this does not mean that there is only one bus or only one type of bus.

In another embodiment of this disclosure, a readable storage medium is further provided. The readable storage medium stores a computer executable instruction. When a device (which may be a single-chip microcomputer, a chip, or the like) or a processor performs steps of the first node and the second node in the resource configuration method provided in FIG. 4, FIG. 5, FIG. 6, and FIG. 7, a computer executable instruction in a storage medium is read. The foregoing readable storage medium may include any medium that can store program code, such as a USB flash drive, a removable hard disk, a read-only memory, a random access memory, a magnetic disk, or an optical disc.

In another embodiment of this disclosure, a computer program product is further provided. The computer program product includes a computer-executable instruction, and the computer-executable instruction is stored in a computer-readable storage medium. At least one processor of a device may read the computer-executable instruction from the computer-readable storage medium. At least one processor executes the computer executable instruction, so that the device performs the steps of the first node and the second node in the resource configuration method provided in FIG. 4, FIG. 5, FIG. 6, or FIG. 7.

In another embodiment of this disclosure, a communications system is further provided. The communications system includes a plurality of devices, and the plurality of devices include a first node and a second node. The first node may be the first node provided in FIG. 8 or FIG. 9, and is configured to perform the steps of the first node in the timing method for a first slot or subframe provided in FIG. 4, FIG. 5, FIG. 6, or FIG. 7, and/or the second node may be the second node provided in FIG. 10 or FIG. 11, and is configured to perform the steps of the second node in the timing method for a first slot or subframe provided in FIG. 4, FIG. 5, FIG. 6, or FIG. 7. It should be understood that the communications system may include a plurality of first nodes, that is, the second node may have a plurality of first nodes, and the plurality of first nodes have a same or similar function.

In this embodiment of this disclosure, after the first node sends timing information of the first slot or subframe to the second node, the second node performs uplink transmission or downlink data receiving by using a timing of the first slot or subframe, so that the first node can receive data of both a third node and the second node in the first slot or subframe, or transmits data to a third node or the second node. Therefore, interference caused by a timing problem is avoided, and a timing transmission problem of the first slot or subframe is resolved, so that the first node receives data of both the third node and the second node, or data transmission to the third node or the second node is technically implemented, thereby improving spectrum resource efficiency of an entire relay system.

In conclusion, the foregoing descriptions are merely example implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A first node device, comprising:
a transmitter;
a receiver;
a processor; and
a non-transitory computer-readable storage medium storing a program to be executed by the processor, the program including instructions to:
cause the transmitter to send, to a second node device, an offset of a first uplink sending timing of the second node device and a first amount of timing adjustment of the second node device, wherein the offset is determined according to a cyclic prefix range and a difference between a first time point at which data transmitted by the second node device arrives at the first node device and a second time point at which downlink transmission of a third node is received at the first node device;
cause the transmitter to send, in scheduling signaling, indication information to the second node device separately from, and at least one slot or subframe after, the sending of the offset of the first uplink sending timing and the first amount of timing adjustment, wherein the indication information indicates whether the second node device sends uplink data using the first uplink sending timing of the second node device or using another uplink sending timing; and
receive, through the receiver, data sent by the second node device;
wherein the first node device is a parent node device of the second node device and is a relay node.

2. The device according to claim 1, wherein the program further includes instructions to perform at least one of:
determine the offset of the first uplink sending timing of the second node device and the first amount of timing adjustment of the second node device; or
determine to send the indication information to the second node device.

3. The device according to claim 1, wherein the offset of the first uplink sending timing of the second node device is at least one of:
an offset relative to a second uplink sending timing of the second node device; or
a timing offset relative to a transmit slot or subframe of the second node device.

4. The device according to claim 1, wherein the offset of the first uplink sending timing of the second node device and the first amount of timing adjustment of the second node device are sent by using different messages.

5. The device according to claim 1, wherein the offset of the first uplink sending timing of the second node device and the first amount of timing adjustment of the second node device are configured separately.

6. The device according to claim 1, wherein the offset of the first uplink sending timing of the second node is incrementally configured.

7. A first node device, comprising:
a transmitter;
a processor; and
a non-transitory computer-readable storage medium storing a program to be executed by the processor, the program including instructions to:
cause the transmitter to send an offset of a first downlink sending timing of the first node device to a second node device, wherein the offset is determined according to a cyclic prefix range and a difference between a first time point at which data transmitted by the second node device arrives at the first node device and a second time point at which downlink transmission of a third node is received at the first node device;
cause the transmitter to send, in scheduling signaling, indication information to the second node device separately from, and at least one slot or subframe after, the sending of the offset of the first downlink sending timing, wherein the indication information indicates whether the second node device receives downlink data using the first downlink sending timing of the first node device or using another uplink sending timing; and
cause the transmitter to send data to the second node device;
wherein the first node device is a parent node device of the second node device and is a relay node.

8. The device according to claim 7, wherein the program further includes instructions to perform at least one of:
determine the offset of the first downlink sending timing of the first node device; or
determine to send the indication information to the second node device.

9. The device according to claim 7, wherein the offset of the first downlink sending timing of the first node device is a timing offset relative to a start position of a transmit slot or subframe of the first node device.

10. The device according to claim 7, wherein the offset of the first downlink sending timing of the first node device is an incremental value of the offset of a first uplink sending timing of the second node, and indicates to perform forward or backward adjustment on the first uplink sending timing of the second node.

11. A second node device, comprising:
a receiver;
a transmitter;
a processor; and
a non-transitory computer-readable storage medium storing a program to be executed by the processor, the program including instructions:
receive, through the receiver, an offset of a first uplink sending timing of the second node device and a first amount of timing adjustment of the second node device that are sent by a first node device, wherein the offset is associated with a cyclic prefix range and a difference between a first time point at which data transmitted by the second node device arrives at the first node device and a second time point at which downlink transmission of a third node is received at the first node device;
receive, through the receiver, in scheduling signaling, indication information sent by the first node device separately from, and at least one slot or subframe after, the receiving of the offset of the first uplink sending timing and the first amount of timing adjustment, wherein the indication information indicates whether the second node device sends uplink data using the first uplink sending timing of the second node device or using another uplink sending timing; and
cause the transmitter to send data to the first node device;

wherein the first node device is a parent node device of the second node device and is a relay node.

12. The device according to claim 11, wherein the program further includes instructions to:
   determine the first uplink sending timing of the second node device according to at least one of:
   the offset of the first uplink sending timing of the second node device and the first amount of timing adjustment of the second node device; or
   the indication information sent by the first node device.

13. The device according to claim 11, wherein the offset of the first uplink sending timing of the second node device is at least one of:
   an offset relative to a second uplink sending timing of the second node device; or
   a timing offset relative to a transmit slot or subframe of the second node device.

14. The device according to any one of claim 11, wherein the offset of the first uplink sending timing of the second node device and the first amount of timing adjustment of the second node device are sent by using different messages.

15. The device according to claim 11, wherein the offset of the first uplink sending timing of the second node device and the first amount of timing adjustment of the second node device are configured separately.

16. The device according to claim 11, wherein the offset of the first uplink sending timing of the second node is incrementally configured.

17. A second node device, comprising:
   a receiver;
   a transmitter;
   a processor; and
   a non-transitory computer-readable storage medium storing a program to be executed by the processor, the program including instructions for:
   receive, through the receiver, an offset, sent by a first node device, of a first downlink sending timing of the first node, wherein the offset is associated with a cyclic prefix range and a difference between a first time point at which data transmitted by the second node device arrives at the first node device and a second time point at which downlink transmission of a third node is received at the first node device;
   receive, through the receiver, in scheduling signaling, indication information sent by the first node device separately from, and at least one slot or subframe after, the receiving of the offset of the first downlink sending timing, wherein the indication information indicates whether the second node device receives downlink data using the first downlink sending timing of the first node device or using another downlink sending timing; and
   cause the transmitter to send data to the first node device;
   wherein the first node device is a parent node device of the second node device and is a relay node.

18. The device according to claim 17, wherein the program further includes instructions to determine a first downlink reception timing of the second node device according to at least one of:
   a received offset of a first uplink sending timing of the second node device and a received first amount of timing adjustment of the second node device; or
   the indication information sent by the first node device.

19. The device according to claim 18, wherein the offset of the first downlink sending timing of the first node device is an incremental value of the offset of the first uplink sending timing of the second node, and indicates to perform forward or backward adjustment on the first uplink sending timing of the second node.

20. The device according to claim 17, wherein the offset of the first downlink sending timing of the first node device is a timing offset relative to a start position of a transmit slot or subframe of the first node device.

* * * * *